United States Patent [19]

Vick

[11] Patent Number: 4,644,971
[45] Date of Patent: Feb. 24, 1987

[54] HIGH PRESSURE PILOT OPERATED VALVE

[75] Inventor: Ralph L. Vick, Granada Hills, Calif.
[73] Assignee: Allied Corporation, Morristown, N.J.
[21] Appl. No.: 781,829
[22] Filed: Sep. 30, 1985
[51] Int. Cl.$^4$ .......................................... F15B 13/043
[52] U.S. Cl. .......................... 137/625.64; 137/625.66; 137/625.68
[58] Field of Search ...................... 137/625.64, 625.66, 137/625.68

[56] References Cited
U.S. PATENT DOCUMENTS
4,458,718  7/1984  Vick .................................. 137/505

Primary Examiner—Gerald A. Michalsky
Attorney, Agent, or Firm—Robert C. Smith; Vett Parsigian

[57] ABSTRACT

A high pressure pilot operated valve includes a housing with inlet and outlet passages, an internal bore communicating the passages and slide valve member movable between a first position blocking fluid flow and a second position permitting fluid flow. A spring in a low pressure chamber urges the slide valve member in the closing direction. A stem on the opposite end of the slide valve member is selectively exposed to a control pressure by means of a pilot valve connected to high pressure fluid to cause the slide valve member to move to the second position. The inlet passage communicates with the hollow interior of the slide valve member and with metering orifices in its sidewalls. A passage in the slide valve member having a radial conduit opening against the bore near its stem end connects the outlet passage with a low pressure chamber when the slide valve member is in the first position and is blocked when in the second position. A plurality of dynamic seals in the bore operate to contain high inlet pressure when the valve is closed and are spaced from the outlet passage and the radial conduit to protect them from high pressure flows when the valve is opened.

15 Claims, 3 Drawing Figures

HIGH PRESSURE PILOT OPERATED VALVE

This invention relates to valves and more particularly to a pilot operated valve for use with an operating fluid under pressures considerably higher than those normally encountered.

The valve disclosed is of a type having a valve body or housing with an internal bore, and inlet and an outlet passage and a slide valve member movable between two positions to either block or permit flow through the valve. The slide valve member is urged toward a closed position by a spring and has a small area control surface on its opposite end which is connected to a source of high pressure fluid. A pilot valve connected between the small area control surface and the high pressure source controls the movement of the slide valve member in the opposite direction. A larger area control surface may be used if a larger flow is available from the pilot valve, or if somewhat slower response times are acceptable. In applicant's device, it is desired that the size of the pilot valve be minimized and that the response time be as short as practical. The pilot valve may be operated by a solenoid, an electrohydraulic servo valve, a pneumatic control valve or other desired control means. The slide valve member includes an internal chamber communicating with the inlet passage and metering orifices in its wall.

The above described pilot activated valve is of a well known type which is used in many applications. When operated in an environment of normal fluid pressures such as 3000 psi or less conventional seals and sealing arrangements are acceptable. In instances where one desires to operate such a valve with fluid pressures of the order of 8000 psi, some different arrangements are required. In general, a valve of this type operating at 8000 psi will require lap fitting of the internal piston or slide valve to the bore which is, in itself, expensive, and which usually also requires comparatively thick walls of the body, hence, greater weight which is undesirable.

Another choice is to use poppet-type valves which contain high pressure reasonably well but which are subject to damage from erosion when operated in the range of 8000 psi. So what is needed is a pilot operated slide type valve which is of light weight, not requiring thick walls or lap fits, but which can be operated in the 8000 psi range of fluid pressures with conventional seals. With this type of valve it is conventional to effect seals between the valve body and the piston or slide valve member by providing grooves in either the valve body bore or the piston and placing in each groove an O-ring (usually of synthetic rubber) with a sealing ring of a low friction material such as polytetrafloroethylene in the groove between the O-ring and the opposing relatively movable surface. This type of seal which is adequate at low pressure is subject to several kinds of damage at high pressure such as 8000 psi. For example, if an edge of the sealing ring is exposed to the entire 8000 psi and the resulting flow, it will tend to be blown or extruded into the space between the relatively movable members. Further, the sealing ring is subject to being "nibbled away" by the edges of the metering orifices as they pass over it. Applicant has determined that with careful design, such seals may be used in a valve of the type described at 8000 psi.

The pilot operated valve of the present invention is characterized in that the slide valve member includes a passageway including a first radially directed conduit having an outlet adjacent to the bore, which connects the outlet passage with a low pressure source when the slide valve member is in its closed position. A second radially directed conduit is also connected to the passageway and opens against the bore on the opposite side of a dynamic seal as described above which is carried in the bore of the valve body. A second such seal is in the bore and displaced toward the outlet passage a distance such that when the slide valve member is in its open position, outlets of both of the radially directed conduits are located between the first and second seals. A third dynamic seal is located in the bore between the second dynamic seal and the outlet passage and displaced away from the outlet passage a distance slightly greater than the axial length of the metering orifices and a fourth dynamic seal is located in the bore on the opposite side of the outlet passage from the third such seal.

The pilot operated valve of the present invention is further characterized in that the first radially directed conduit communicates with an axial passage in the bore connected with the low pressure source when the slide valve member is in its closed position and the first dynamic seal is displaced from the axial passage by a distance greater than the axial length of the outlet of the first radially directed conduit.

A major advantage of the present invention is that with the arrangement described, the high pressures to which the sealing rings are exposed occurs only when there is very little flow and when the slide valve member is moved the pressure forces the sealing rings away from the orifice openings thereby preventing abrasion or "nibbling" of the seals by the orifice edges. This effect is further aided by chamfering the orifice edges and making the seals of greater axial length than the orifice openings.

After passing the seal, the orifice openings traverse a length of the bore slightly greater than their own axial length before they open into the outlet passage or, in the case of the first radially directed orifice, into the axial passage in the bore which communicates with the low pressure source. With this arrangement, the sealing rings are never exposed to the full force of the initial flow when the valve first cracks open.

The invention will now be described with reference the accompanying drawings in which.

Figure 1:
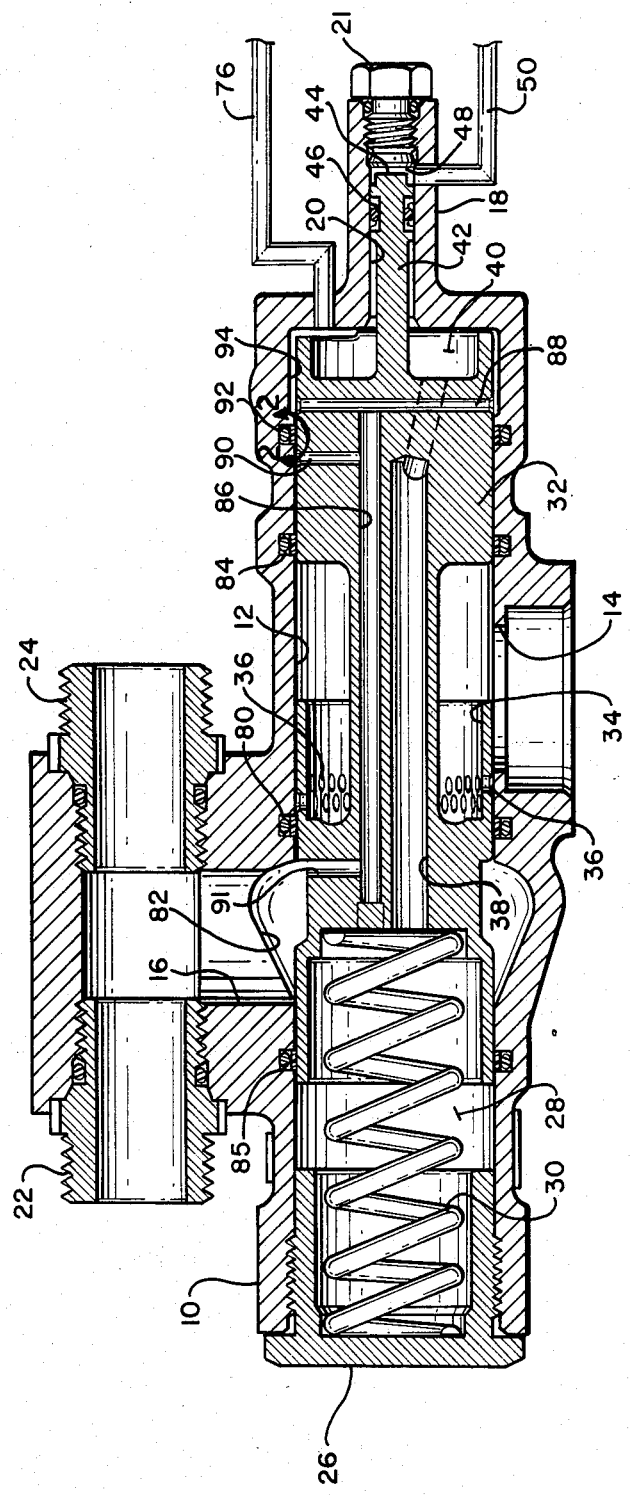
FIG. 1 is a cross-sectional view of a pilot operated valve incorporating my invention.

The main housing or valve body 10, which is, or may be, generally cylindrical in shape except for certain extensions, includes a large diameter central bore 12, an inlet passage 14 and an outlet passage 16. At one end of housing 10 is a small diameter extension 18 containing a small diameter bore 20 which is axially aligned with bore 12. Attached to the top of housing 10 are fittings 22 and 24 for connecting the output passage to external utilization devices which may consist of a pair of piston-type actuators (not shown). A plug 26 is threadedly engaged with valve body 10 and closes the left end thereof forming with said valve body a low pressure or return pressure chamber 28. Chamber 28 contains a large diameter spring 30 which urges a slide valve member 32 toward the right. Slide valve member 32, which is shown in its right hand or closed position, includes an internal chamber 34 which provides communication between the inlet passage 14 and a plurality of metering orifices 36. A conduit 38 of moderately large diameter runs generally axially through the length of slide valve member 32 and provides communication between the return pressure chamber 28 and a smaller chamber 40 at the right end of slide valve member 32. At the right end of slide valve member 32 is a small diameter stem 42 having a piston face 44 at one end. A seal 46 isolates low pressure chamber 40 from a chamber 48 at the right end of stem 42.

A small diameter conduit 50 provides communication between chamber 48 and a pilot valve shown generally at numeral 52. Pilot valve 52 includes a housing 54 containing electrical windings 56 surrounding axially aligned pole pieces 58. An armature member 60 moves axially when winding 56 is energized and carries with it a small diameter rod 62 located in an axial passageway through the center of pole pieces 58. Rod 62 which moves with the armature member 60 contacts a ball valve member 64 which in turn contacts an additional rod member or pin 66 which contacts a second ball valve member 68. Between ball valve members 64 and 68 and surrounding rod 66 is a passage 70 which provides communication between a high pressure inlet port 72 and the control pressure line 50. At the left end of the pole member 58 is a chamber 74 which is connected to a source of return or low pressure through a conduit 76. Conduit 76 may communicate with chamber 40 or any other suitable source of fluid at low pressure.

Operation of the solenoid pilot valve is as follows: when the solenoid winding 56 is energized the core member 60 moves toward the left to move rod 62 and pin 66 to push ball valve member 68 off its seat and permitting high pressure in conduit 72 to pass into conduit 70 and through control line 50 to the operating pressure chamber 48 which will move the slide valve 32 toward the left. When the solenoid windings 56 are deenergized, the high pressure in port 72 tends to hold valve 68 on its seat, pushing pin 66 and ball valve member 64 toward the right and providing communication between control pressure line 50 and the chamber 74 which communicates with low pressure source through conduit 76. The pressure in chamber 48 would then vent to a low pressure and the spring 30 would urge slide valve member 32 toward the right.

The particular valve shown in FIG. 1 is designed to be connected to a source of very high fluid pressure such as 8000 psi which is connected through the inlet conduit 14 to the interior of chamber 34. While this pressure is present in this chamber it is communicated through the metering ports 36 to the exterior surface of the slide valve member 32 but is contained between a dynamic seal 80 positioned between the metering ports and a chamber 82 which communicates with the outlet passage 16, and another dynamic seal 84 located in the housing 10 such that it exerts force against the slide valve member 32 on the right side of chamber 34. Thus dynamic seals 80 and 84 tend to confine the pressure in chamber 34 when slide valve 32 is in its closed position. An axial passage 86 in slide valve 32 communicates with a first radially directed orifice 88 which has an outlet on the exterior surface of slide valve 32, a second radially directed orifice 90 which communicates passageway 86 with the surface of slide valve 32 on the opposite side of an additional dynamic seal 92 and with a radially directed passage 91 which communicates passageway 86 with outlet chamber 82. The high pressure from passage 36 will impinge against the sloped surface of outlet chamber 82 and is directed against the adjacent radially directed shoulder of slide valve 32, thus providing additional force urging slide valve 32 to the left. It will be noted that the housing 10 includes a slightly enlarged diameter portion 94 which may also consist of one or more axially directed channels extending from the end of radial orifice 88 around the end of slide valve member 32 and to the low pressure chamber 40. With this arrangement and with the slide valve in the position shown, pressure in the outlet passage 82 is quickly exhausted through conduit 91, axial passage 86, conduit 88 and passage 94 into low pressure chamber 40.

When the solenoid operated pilot valve is energized, the high pressure is communicated from passage 72 through control channel 50 to the pressure chamber 48. This high pressure acting on the stem 44 will urge slide valve member 32 toward the left and causing the metering orifices 36 to begin traveling over the surface of the seal 80. Because of the physical orientation of seal 80 there is still no significant flow through the orifices 36 and the pressure simply pushes the seal farther back into the groove and tends to avoid having its surface abraded or nibbled by the edge of the metering orifices. As the metering orifices move farther to the left, they will pass the seal 80 and will still be in contact with the surface of bore 12 before they are finally exposed to the outlet chamber 82. In this way, seal 80 is never directly exposed to the sudden heavy flow which results as the valve is cracked open. When the solenoid is de-energized and the control pressure 50 is dumped through the return channel 76, the slide valve 32 is rather quickly returned toward the right under the urging of spring 30. At this time, the radial orifice 88 will cross the seal 92 but again because of the configuration of seal 92 the high pressure in this line will simply tend to force the seal back into its groove and to help prevent its being abraded from the passage of the opening of conduit 88. This opening will pass another short section of the bore 12 before finally reaching the axial passage 94 which permits the high pressure in the outlet passage 82 to be exhausted to return.

Figure 2:
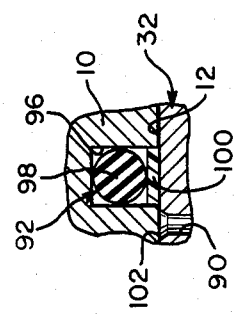
FIG. 2 is an enlargement of the portion of FIG. 1 designated 2—2.
Figure 1A:
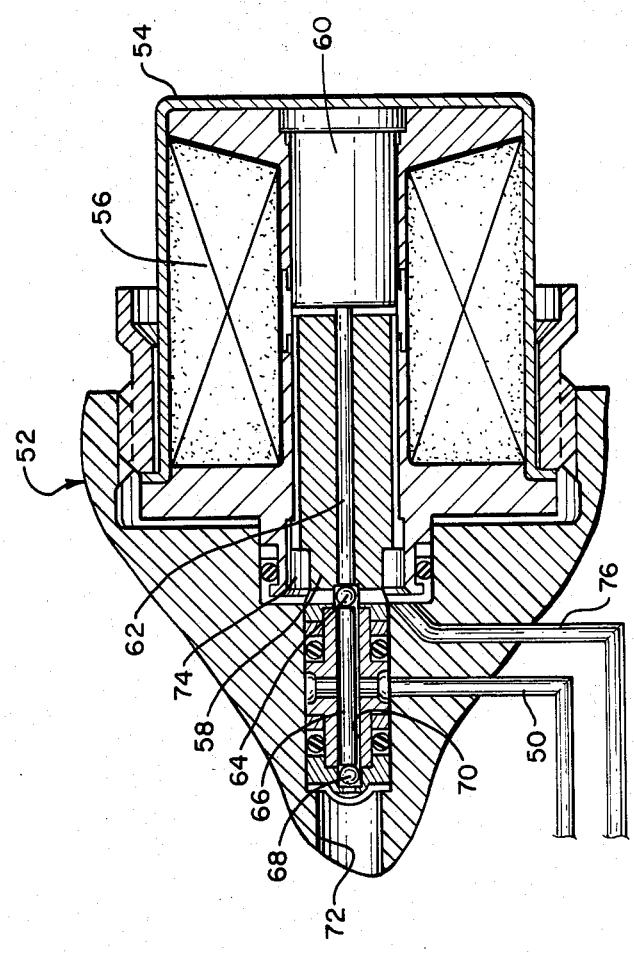
FIG. 1A is a cross-sectional view of a pilot valve used in association with the pilot operated valve of FIG. 1.

FIG. 2 is an enlarged view of the portion of FIG. 1 indicated 2—2 and shows the details of the structure of the dynamic seals such as seal 92. A groove 96 is formed in the wall of bore 12 of housing 10. Carried in the groove 96 is an O-ring 98 of rubber or other elastomeric material with the O-ring 98 backing a sealing ring 100 of low friction material such as polytetrafluroethylene. Shown displaced slightly along bore 12 from ring 100 is orifice 90 in the slide valve member 32. It will be observed that a chamfer 102 is formed on the outlet of orifice 92. All of metering orifices 36 have such a chamfered outlet as has radial conduit 88. The chamfers are preferably sized such that their maximum diameter is less than the axial length of sealing ring 100 and the other such sealing rings. To keep seal 80 from being significantly involved in the metering function of the valve, it is preferable also that the maximum diameter of the chamfer on metering orifices 36 be less than the length of bore 12 between the edge of the seal groove nearest outlet chamber 82 and the nearest edge of chamber 82. Essentially the same relationships should be maintained with respect to seal 92 and its sealing ring, the chamfer at the outlet of radial conduit 88, and the length of the section of bore 12 between the right edge of groove 96 for seal 92 and the axial passage 94.

The pilot operated valve described above has substantial advantages over prior art valves when viewed in the context of a requirement for operating in an 8000 psi environment with zero leakage or minimal leakage. It is more durable than poppet-type valves which suffer from erossion at such pressures. As compared with a valve with heavy walls and lap fitted slide valve member and bore, the present valve is much less expensive and also lighter in weight. It can operate with conventional seals because among other things, the seals are not exposed to metering flows, particularly the initial flows as the valve opens.

I claim:

1. A valve construction including a valve body having an inlet passage and an outlet passage with an internal bore communicating with said passages,
 a slide valve member movable in said bore between a first position blocking communication between said passages and a second position communicating said passages, said member including an internal chamber communicating with said inlet passage and a plurality of metering orifices through the wall of said member which provide communication between said internal chamber and said outlet passage, a source of fluid under high pressure and means connecting said source to said inlet passage, and a low fluid pressure source, and operator-operated means for controlling movement of said slide valve member;
 characterized in that said slide valve member further includes a passageway including a first radially directed conduit having an outlet adjacent said bore and which connects said outlet passage with said low pressure source when said member is in said first position, a first dynamic seal is positioned in said housing acting against said member near the outlet of said radially directed conduit, a second radially directed conduit connecting said passageway with said bore and having an outlet adjacent to said bore on the opposite side of said first dynamic seal from the outlet of said first radially directed conduit when said member is in said first position, a second dynamic seal in said housing acting against said member axially displaced toward said outlet passage from said second radially directed conduit, a third dynamic seal in said housing acting against said member and displaced from said outlet passage a distance only slightly greater than the axial length of any of said metering orifices, a fourth dynamic seal in said bore acting against said member on the opposite side of said outlet passage from said third dynamic seal,
 each of said dynamic seals comprising an annular groove in the wall of said bore, an O-ring in said groove and a low friction sealing ring in said groove in contact with said member.

2. A valve construction as set forth in claim 1 wherein the outlets of said first and second radially directed conduits are located between said first and second dynamic seals when said member is in said second position.

3. A valve construction as set forth in claim 1 wherein said slide valve member includes a radially outwardly extending shoulder adjacent said outlet passage and said housing includes a chamber adjacent said outlet passage having a surface tapering toward said shoulder such that when said slide valve member moves to said second position, fluid flow into said chamber will increase pressure against said shoulder and urge said member toward said second position.

4. A valve construction as set forth in claim 1 wherein said slide valve member includes a large area control surface at one end connected to said low fluid pressure source and a spring acting against said control surface urging said member to said first position, a control surface at the opposite end of said slide valve member, a conduit connecting said control surface with a source of fluid under high pressure, and pilot valve means controlling flow through said conduit.

5. A valve construction as set forth in claim 1 wherein said metering orifices are cylindrical and chamfered at the external surface of said member.

6. A valve construction as set forth in claim 5 wherein the axial length of said low friction sealing ring is greater than the diameter of the chamfered outlet of any one of said metering orifices.

7. A valve construction as set forth in claim 1 wherein said third dynamic seal is spaced from said outlet port a distance such that only very limited fluid flow passes through said metering orifices until said member has moved said orifices past said seal and said orifices begin to communicate with said outlet port.

8. A valve construction as set forth in claim 1 wherein the outlet of said first radially directed conduit is cylindrical and chamfered at the external surface of said member.

9. A valve construction as set forth in claim 1 wherein said connection between said first radially directed conduit and said low pressure source includes axial passage means in said bore communicating with said radially directed conduit when said member is in said first position and said first dynamic seal is spaced from said axial passage means a distance greater than the diameter of the outlet of said first radially directed conduit.

10. A pilot actuated valve including a housing having a high pressure inlet passage, and outlet passage connected to an external utilization device, a slide valve member in said housing having metering orifices and movable between a first position blocking flow between said inlet and outlet passages and a second position permitting flow between said passages, a low fluid pressure chamber in said housing and resilient means in said chamber urging said slide valve member toward said first position, and a pilot valve connected to said housing,
 characterized in that said slide valve member includes a stem having a small diameter control surface at its end opposite said resilient means, a passageway is provided connecting said small diameter control surface with a high fluid pressure source, with said pilot valve controlling flow through said passageway, a large diameter surface of said slide valve member adjacent said stem and means sealing said large diameter surface from said small diameter control surface, a first axial passageway through said slide valve member connecting said large diameter surface with said low fluid pressure chamber, a second axial passageway through said slide valve member connected at one end with said outlet passage and at its opposite end with a radial conduit to the external surface of said slide valve member, means connecting said radial conduit with said large diameter surface, a first dynamic seal in said housing acting against said slide valve member located near the outlet of said radial conduit, a second radial conduit on the opposite side of said first dynamic seal connected between said second axial passageway and the external surface of said slide valve member, a second dynamic seal in said housing acting against said slide valve member axially displaced toward said outlet passage from said second radial conduit, a third dynamic seal in said housing acting against said slide valve member displaced from said outlet passage a distance only slightly greater than the axial length of said metering orifices; a fourth dynamic seal in said housing acting against said slide valve member positioned between said outlet passage and said low fluid pressure chamber, said slide valve member including an internal chamber communicating with said inlet passage and said metering orifices comprising a plurality of radial metering ports through the wall of said slide valve member which are axially displaced from said outlet passage and located on the opposite side of said third dynamic seal when said slide valve member is in said first position and communicating with said outlet passage when said slide valve member is moved to said second position, each said dynamic seal including an annular groove in an interior wall of said housing and an O-ring with a low friction sealing ring in said annular groove.

11. A pilot actuated valve as set forth in claim 10 wherein said first and second radial conduits are located between said first and second dynamic seals when said slide valve member is in said second position.

12. A pilot actuated valve as set forth in claim 10 wherein said slide valve member includes a radially outwardly extending shoulder adjacent said outlet passage and said housing includes a chamber adjacent said outlet passage having a surface tapering toward said shoulder such that when said slide valve member moves to said second position, fluid flow into said chamber will increase pressure against said shoulder and urge said member further toward said second position.

13. A pilot actuated valve including a housing having a high pressure inlet passage, and outlet passage connected to an external utilization device, a slide valve member in said housing having metering orifices and movable between a first position blocking flow between said inlet and outlet passages and a second position permitting flow between said passages, a low fluid pressure chamber in said housing and resilient means in said chamber urging said slide valve member toward said first position, and a pilot valve connected to said housing, characterized in that said slide valve member includes a small area control surface at its end opposite said resilient means, said small area control surface is connected through a passageway to a high pressure source and said pilot valve is connected to control flow through said passageway, a large area control surface of said slide member at the same end thereof as said small area control surface and dynamic seal means interposed between said control surfaces, means connecting said low fluid pressure chamber with said large area control surface, a first radial conduit at the end of said slide valve member nearest said large area control surface and communicating therewith when said slide valve member is in said first position, a generally axial passageway connecting said radial conduit with said outlet passage, a first dynamic seal in said housing acting against said slide valve member in close proximity to said first radial conduit, a second radial conduit on the opposite side of said seal from said first radial conduit communicating with said generally axial passageway, a second dynamic seal in said housing acting against said slide valve member axially displaced toward said outlet passage from said second radial conduit such that when said slide valve member moves to said second position, outlets of both said radial conduits are between said first and second dynamic seals, a third dynamic seal in said housing acting against said slide valve member displaced from said outlet passage a distance only slightly greater than the axial length of said metering orifices, a fourth dynamic seal in said housing acting against said slide valve member positioned between said outlet passage and said low fluid pressure chamber said slide valve member including an internal chamber communicating with said inlet passage and said metering orifices comprise a plurality of raidal metering ports through the wall of said slide valve member which are axially displaced from said outlet passage and located on the opposite side of said third dynamic seal when said slide valve member is in said first position and communicating with said outlet passage when said slide valve member is moved to said second position, each said dynamic seal including an annular groove in an interior wall of said housing and an O-ring with a low friction sealing ring in said annular groove.

14. A pilot actuated valve including a valve body having an internal bore, an inlet passage and an outlet passage in said body communicating with said bore, a slide valve member in said bore movable from a first position blocking communication between said inlet passage and said outlet passage to a second position providing communication between said passages, a low fluid pressure chamber in said bore adjacent one end of said slide valve member, a spring in said chamber urging said slide valve member toward said first position, a small area control surface at the opposite end of said slide valve member, a conduit connecting said small area control surface to a source of fluid under high pressure and a pilot valve controlling flow through said conduit characterized in that said slide valve member includes a large area control surface at said opposite end connected to said low fluid pressure chamber, a radial conduit communicating with said bore adjacent said large area control surface and means including an axial passageway communicating said radial conduit with said outlet passage, a first dynamic seal in said housing and acting against said slide valve member in close proximity to said first radial conduit, a second radial conduit on the opposite side of said seal from said first radial conduit communicating with said axial passageway, a second dynamic seal in said housing acting against said slide valve member axially displaced toward said outlet passage from said second radial conduit such that when said slide valve member moves to said second position outlets of both said radial conduits are between said first and second dynamic seals, a third dynamic seal in said housing acting against said slide valve member displaced from said outlet passage a distance only slightly greater than the axial length of said metering ports, a fourth dynamic seal in said housing acting against said slide valve member positioned between said outlet passage and said low fluid pressure chamber, said slide valve member including an internal chamber communicating with said inlet passage and a plurality of radial metering orifices through the wall of said slide valve member which are axially displaced from said outlet passage and located on the opposite side of said third dynamic seal when said slide valve member is in said first position and communicating with said outlet passage when said slide valve member is moved to said second position, each said dynamic seal including an annular groove in an interior wall of said housing and an O-ring with a low friction sealing ring in said annular groove.

15. A pilot operated valve as set forth in claim 14 wherein said metering orifices are cylindrical and chamfered at the exterior surface of said slide valve member.

* * * * *